(12) United States Patent
Tong et al.

(10) Patent No.: US 9,462,425 B2
(45) Date of Patent: *Oct. 4, 2016

(54) SYSTEM AND METHOD FOR SPATIAL MULTIPLEXING-BASED MULTIPLE ANTENNA BROADCAST/MULTICAST TRANSMISSION

(71) Applicant: APPLE INC., Cupertino, CA (US)

(72) Inventors: Wen Tong, Cupertino, CA (US); Jianglei Ma, Cupertino, CA (US); Mo-Han Fong, Cupertino, CA (US); Peiying Zhu, Cupertino, CA (US); Aaron Callard, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,994

(22) Filed: Jan. 5, 2015

(65) Prior Publication Data

US 2015/0109990 A1 Apr. 23, 2015

Related U.S. Application Data

(63) Continuation of application No. 12/865,627, filed as application No. PCT/CA2008/000203 on Feb. 1, 2008, now Pat. No. 8,929,325.

(51) Int. Cl.
*H04W 4/00* (2009.01)
*H04W 4/06* (2009.01)
(Continued)

(52) U.S. Cl.
CPC .............. *H04W 4/06* (2013.01); *H04B 7/0874* (2013.01); *H04H 20/42* (2013.01); *H04H 20/67* (2013.01);
(Continued)

(58) Field of Classification Search
None
See application file for complete search history.

(56) References Cited

U.S. PATENT DOCUMENTS

| 6,240,077 B1 * | 5/2001 | Vuong | H04J 3/1682 |
| | | | 370/319 |
| 7,392,015 B1 * | 6/2008 | Farlow | H04B 17/21 |
| | | | 342/387 |

(Continued)

*Primary Examiner* — Bunjob Jaroenchonwanit
(74) *Attorney, Agent, or Firm* — Fay Kaplun & Marcin, LLP

(57) ABSTRACT

Methods and devices are provided for implementing two types of sub-channel arrangements. A first type of sub-channel arrangement involves defining a first traffic portion and a second traffic portion of a transmission resource, transmitting broadcast traffic on at least one first antenna of a plurality of antennas in the first traffic portion using a first sub-channelization, transmitting multicast traffic on at least one second antenna of the plurality of antennas, the at least one second antenna being distinct from the at least one first antenna, in the first traffic portion using a second sub-channelization, and transmitting unicast traffic on at least one antenna of the plurality of antennas in the second traffic portion using a third sub-channelization. A second type of sub-channel arrangement involves defining a first traffic portion and a second traffic portion, wherein for a portion of the transmission resource, a portion of the first traffic portion overlaps with a portion of the second traffic portion. In the portion of the transmission resource in which a portion of the first traffic portion overlaps with a portion of the second traffic portion, the channel arrangement involves transmitting broadcast/multicast traffic on at least one first antenna of a plurality of antennas using a first sub-channelization and b) transmitting unicast traffic on at least one second antenna of the plurality of antennas, the at least one second antenna being distinct from the at least one first antenna, using a second sub-channelization. The first, second and third sub-channelizations may be based on either one of or a combination of FDM sub-channelization and TDM sub-channelization.

14 Claims, 10 Drawing Sheets

(51) Int. Cl.
*H04W 72/12* (2009.01)
*H04W 72/00* (2009.01)
*H04W 72/04* (2009.01)
*H04B 7/08* (2006.01)
*H04H 20/42* (2008.01)
*H04H 20/67* (2008.01)
*H04H 20/72* (2008.01)
*H04W 52/32* (2009.01)
*H04L 12/18* (2006.01)

(52) U.S. Cl.
CPC .......... *H04H 20/72* (2013.01); *H04W 52/327* (2013.01); *H04W 72/005* (2013.01); *H04W 72/04* (2013.01); *H04W 72/0453* (2013.01); *H04W 72/121* (2013.01); *H04L 12/189* (2013.01)

(56) References Cited

U.S. PATENT DOCUMENTS

| | | | | |
|---|---|---|---|---|
| 7,751,305 B2* | 7/2010 | Jung | ...................... | H04L 1/0071 370/203 |
| 8,000,292 B2* | 8/2011 | Cai | ...................... | H04W 72/005 370/312 |
| 8,340,006 B2* | 12/2012 | Yu | ...................... | H04B 7/0669 370/310 |
| 8,644,200 B2* | 2/2014 | Willenegger | ...... | H04W 72/005 370/206 |
| 8,644,826 B2* | 2/2014 | Futaki | ...................... | H04W 72/005 455/435.2 |
| 2002/0003833 A1* | 1/2002 | Usuda | ...................... | H04B 7/0857 375/144 |
| 2002/0164963 A1* | 11/2002 | Tehrani | ...................... | H04B 7/061 455/101 |
| 2003/0087673 A1* | 5/2003 | Walton | ...................... | H04B 7/0452 455/562.1 |
| 2005/0018678 A1* | 1/2005 | Keller | ...................... | H04L 12/189 370/390 |
| 2005/0160181 A1* | 7/2005 | Kwon | ...................... | H04L 1/0002 709/238 |
| 2006/0039344 A1* | 2/2006 | Khan | ...................... | H04L 1/0065 370/345 |
| 2006/0067206 A1* | 3/2006 | Mantravadi | .......... | H04L 5/0048 370/208 |
| 2006/0067417 A1* | 3/2006 | Park | ...................... | H04B 7/0626 375/260 |
| 2007/0002724 A1* | 1/2007 | Khan | ...................... | H04L 5/023 370/203 |
| 2007/0087767 A1* | 4/2007 | Pareek | ...................... | H04W 68/00 455/502 |
| 2007/0104151 A1* | 5/2007 | Papasakellariou | .. | H04L 27/2608 370/335 |
| 2007/0165566 A1* | 7/2007 | Khan | ...................... | H04B 7/022 370/329 |
| 2007/0189289 A1* | 8/2007 | Frederiksen | ............ | H04L 5/023 |
| 2007/0195908 A1* | 8/2007 | Attar | ...................... | H04B 7/0452 375/267 |
| 2007/0232309 A1* | 10/2007 | Koszarsky | ........... | H04B 7/0811 455/436 |
| 2008/0025241 A1* | 1/2008 | Bhushan | ................ | H04L 12/189 370/312 |
| 2008/0056293 A1* | 3/2008 | Robbins | .............. | H04L 12/2801 370/432 |
| 2008/0072269 A1* | 3/2008 | Malladi | ................ | H04W 48/12 725/110 |
| 2008/0080471 A1* | 4/2008 | Rinne | ...................... | H04L 12/18 370/343 |
| 2008/0132263 A1* | 6/2008 | Yu | ...................... | H04J 11/0069 455/515 |
| 2008/0207151 A1* | 8/2008 | Rinne | ...................... | H04B 7/0871 455/140 |
| 2008/0260002 A1* | 10/2008 | Zhang | ................ | H04B 7/0417 375/144 |
| 2008/0268878 A1* | 10/2008 | Wang | ...................... | H04W 68/00 455/458 |
| 2008/0285496 A1* | 11/2008 | Fuchs | ...................... | H04L 67/06 370/311 |
| 2009/0047942 A1* | 2/2009 | Cao | ...................... | H04L 12/1881 455/422.1 |
| 2010/0014603 A1* | 1/2010 | Palanki | ................ | H04L 27/261 375/260 |
| 2010/0040037 A1* | 2/2010 | Choi | ................ | H04W 36/0088 370/345 |
| 2010/0149961 A1* | 6/2010 | Lee | ...................... | H04L 5/0007 370/204 |
| 2010/0246471 A1* | 9/2010 | Chen | ...................... | H04W 4/06 370/312 |
| 2010/0260287 A1* | 10/2010 | Imamura | .............. | H04B 7/0689 375/295 |
| 2010/0330980 A1* | 12/2010 | Breuer | ................ | H04B 7/2606 455/422.1 |
| 2011/0110305 A1* | 5/2011 | Wang | ...................... | H04L 69/02 370/328 |
| 2011/0149942 A1* | 6/2011 | Ko | ...................... | H04B 7/0413 370/343 |
| 2011/0159901 A1* | 6/2011 | Frenger | ................ | H04L 5/0082 455/502 |
| 2011/0317608 A1* | 12/2011 | Li | ...................... | H04B 7/2656 370/312 |
| 2012/0057483 A1* | 3/2012 | Kim | ...................... | H04B 3/542 370/252 |
| 2012/0202548 A1* | 8/2012 | Lee | ...................... | H04B 7/0408 455/513 |
| 2013/0034049 A1* | 2/2013 | Jia | ...................... | H03C 3/00 370/315 |
| 2013/0142069 A1* | 6/2013 | Xing | ...................... | H04B 7/0613 370/252 |
| 2014/0153471 A1* | 6/2014 | Zhang | ................ | H04W 4/06 370/312 |

\* cited by examiner

SYSTEM AND METHOD FOR SPATIAL MULTIPLEXING-BASED MULTIPLE ANTENNA BROADCAST/MULTICAST TRANSMISSION

FIELD OF THE INVENTION

The invention relates to multiple antenna transmission and reception with spatial multiplexing.

BACKGROUND OF THE INVENTION

Orthogonal frequency division multiplexing (OFDM) is a form of multiplexing that distributes data over a number of carriers that have a very precise spacing in the frequency domain. The precise spacing of the carriers provides several benefits such as high spectral efficiency, resiliency to radio frequency interference and lower multi-path distortion. Due to its beneficial properties and superior performance in multi-path fading wireless channels, OFDM has been identified as a useful technique in the area of high data-rate wireless communication, for example wireless metropolitan area networks (MAN). Wireless MAN are networks to be implemented over an air interface for fixed, portable, and mobile broadband access systems.

In some wireless networks, a mobile station (MS) in a given cell is only served by a single base station (BS). One drawback of such wireless networks is that MSs near an edge of the given cell suffer performance loss due to interference from other cells in cellular networks and propagation loss in non-cellular networks.

OFDM may be used for broadcast, multicast or unicast traffic. Broadcast traffic is for reception by all access terminals (i.e. one point to all points), multicast traffic is for multiple, but not necessarily all access terminals (i.e. one point to two or more points), and unicast traffic is for individual access terminals (i.e. one point to another).

SUMMARY OF THE INVENTION

According to an aspect of the invention, there is provided a method in a multiple antenna transmitter comprising: for a transmission resource comprising a frequency component and/or a time component used by the multiple antenna transmitter, defining a first traffic portion and a second traffic portion, the first traffic portion being distinct from the second traffic portion; transmitting broadcast traffic or wide area traffic on at least one first antenna of a plurality of antennas in the first traffic portion using a first sub-channelization based on either one of or a combination of FDM (frequency division multiplexing) sub-channelization and TDM (time division multiplexing) sub-channelization; transmitting multicast traffic or local area traffic on at least one second antenna of the plurality of antennas, the at least one second antenna being distinct from the at least one first antenna, in the first traffic portion using a second sub-channelization based on either one of or a combination of FDM sub-channelization and TDM sub-channelization; transmitting unicast traffic on at least one antenna of the plurality of antennas in the second traffic portion using a third sub-channelization based on either one of or a combination of FDM sub-channelization and TDM sub-channelization.

In some embodiments, using a first, second, and third sub-channelization comprises: using a different value for at least one sub-channelization parameter for the first and second sub-channelizations than is used for at least one sub-channelization parameter for the third sub-channelization.

In some embodiments, using a different value for at least one sub-channelization parameter comprises using a different value for at least one of: FFT size; sub-carrier separation; and number and distribution of data tones in each subchannel.

In some embodiments, transmitting broadcast traffic and multicast traffic further comprises including MIMO pilots in the broadcast traffic and multicast traffic to enable identification of each type of traffic.

In some embodiments, transmitting broadcast traffic and multicast traffic comprises: including gaps between sub-carrier frequency bands or transmission time durations for at least one of the broadcast traffic and the multicast traffic.

In some embodiments, transmitting broadcast traffic or wide area traffic comprises: transmitting broadcast traffic on the at least one first antenna of the plurality of antennas in the first traffic portion; and transmitting multicast traffic or local area traffic comprises: transmitting multicast traffic on the at least one second antenna of the plurality of antennas in the first traffic portion.

In some embodiments, transmitting broadcast traffic or wide area traffic and transmitting multicast traffic or local area traffic comprises transmitting broadcast traffic or wide area traffic and multicast traffic or local area traffic with different transmit powers.

In some embodiments, the broadcast traffic or wide area traffic and the multicast traffic or local area traffic have different transmit powers.

In some embodiments, one or more of the plurality of antennas each has at least one antenna element.

In some embodiments, one or more of the plurality of antennas comprises an antenna array.

In some embodiments, transmitting the first traffic portion and transmitting the second traffic portion comprises transmitting the first traffic portion and the second traffic portion with different frequency re-use factors.

In some embodiments, frequency reuse factors comprise frequency reuse=1 and frequency reuse>1.

According to another aspect of the invention, there is provided a method of reception in a multiple antenna receiver comprising: receiving a signal on a transmission resource comprising a frequency component and/or a time component, the transmission resource comprising a broadcast/multicast traffic portion including broadcast traffic and multicast traffic that are spatially multiplexed and a unicast traffic portion, each portion being distinct in time/frequency from the other; for the broadcast/multicast traffic portion, detecting the broadcast traffic and the multicast traffic.

In some embodiments, detecting the broadcast traffic and the multicast traffic comprises processing MIMO pilots from the broadcast traffic and the multicast traffic, respectively.

In some embodiments, the method further comprises: when the multiple antenna receiver comprises N receive branches and greater than N receive antennas, N>=2, determining whether to use only N or greater than N receive antennas for receiving the signal on the transmission resource.

In some embodiments, each receive branch of the multiple antenna receiver comprises at least one available receive antenna, the method further comprising: estimating channel characteristics for each of the available receive antennas; and selecting at least N available receive antennas for receiving the signal.

In some embodiments, the method further comprises: for a given sub-channel of the broadcast/multicast traffic portion in which content has been sub-divided in time into at least first content and second content with a gap in time between the first content and the second content, estimating channel characteristics for receive antennas receiving the first content; during the gap, switching receive antennas from receive antennas receiving the first content to receive antennas receiving the second content; estimating channel characteristics for receive antennas receiving the second content.

In some embodiments, the method further comprises: performing antenna selection to select a number of receive antennas equal to N for receiving the signal.

In some embodiments, the method further comprises: performing antenna selection to select a number of receive antennas greater than N for receiving the signal.

According to yet another aspect of the invention, there is provided a method in a multiple antenna transmitter comprising: for a transmission resource comprising a frequency component and/or a time component used by the multiple antenna transmitter, defining a first traffic portion and a second traffic portion, wherein for a portion of the transmission resource, a portion of the first traffic portion overlaps with a portion of the second traffic portion; in the portion of the transmission resource in which a portion of the first traffic portion overlaps with a portion of the second traffic portion; a) transmitting broadcast/multicast traffic on at least one first antenna of a plurality of antennas using a first sub-channelization based on either one of or a combination of FDM (frequency division multiplexing) sub-channelization and TDM (time division multiplexing) sub-channelization; b) transmitting unicast traffic on at least one second antenna of the plurality of antennas, the at least one second antenna being distinct from the at least one first antenna, using a second sub-channelization based on either one of or a combination of FDM sub-channelization and TDM sub-channelization.

In some embodiments, transmitting broadcast/multicast and unicast traffic comprises: including gaps between sub-carrier frequency bands or transmission time durations of the unicast traffic.

In some embodiments, the method further comprises: in the portion of the transmission resource in which a portion of the first traffic portion overlaps with a portion of the second traffic portion, using the same value for sub-channelization parameters for both the broadcast/multicast traffic portion and the unicast traffic portion.

In some embodiments, using the same value for sub-channelization parameters comprises using the same value for at least one of: FFT size; sub-carrier separation; and number and distribution of data tones in each subchannel.

In some embodiments, the method further comprises: performing antenna selection at the multiple antenna transmitter to select a subset of a set of available antennas for transmission.

In some embodiments, the method further comprises: performing antenna selection for a future transmission resource for transmission to a multiple antenna receiver to which the multiple carrier transmitter will be transmitting, based on feedback from the receiver for a transmission resource that was previously received by the receiver.

In some embodiments, transmitting broadcast/multicast traffic and unicast traffic further comprises: including pilots in the broadcast/multicast traffic and unicast traffic to enable identification of each type of traffic.

In some embodiments, including pilots in the broadcast/multicast traffic and unicast traffic comprises including orthogonal pilots in at least one of the broadcast/multicast traffic and unicast traffic.

In some embodiments, spatially multiplexing at least one of the broadcast/multicast traffic and the unicast traffic, which are in a portion of the transmission resource that does not overlap with another traffic portion, on at least two antennas of the plurality of antennas.

In some embodiments, transmitting broadcast/multicast traffic and transmitting unicast traffic comprises transmitting broadcast/multicast traffic and unicast traffic with different transmit powers.

In some embodiments, one or more of the plurality of antennas each has at least one antenna element.

In some embodiments, one or more of the plurality of antennas comprises an antenna array.

In some embodiments, transmitting the first traffic portion and transmitting the second traffic portion comprises transmitting the first traffic portion and the second traffic portion with different frequency re-use factors.

In some embodiments, frequency reuse factors comprise frequency reuse=1 and frequency reuse>1.

According to still another aspect of the invention, there is provided a method of reception in a multiple antenna receiver comprising: receiving a signal on a transmission resource comprising a frequency component and/or a time component, the transmission resource comprising a broadcast/multicast traffic portion and a unicast traffic portion and a portion of the transmission resource in which broadcast/multicast traffic and unicast traffic are spatially multiplexed, the portion of the transmission resource in which broadcast/multicast traffic and unicast traffic are spatially multiplexed sharing sub-carriers and/or time duration intervals; for the portion of the transmission resource in which broadcast/multicast traffic and unicast traffic are spatially multiplexed, detecting the broadcast/multicast traffic and the unicast traffic.

In some embodiments, detecting the broadcast/multicast traffic and the unicast traffic comprises processing pilots in each of the broadcast/multicast traffic and unicast traffic to identify the broadcast/multicast traffic and unicast traffic, respectively.

In some embodiments, detecting the broadcast/multicast traffic and the unicast traffic comprises using signal interference cancellation (SIC).

In some embodiments, detecting the broadcast/multicast traffic and the unicast traffic further comprises: performing channel estimation at the multiple antenna receiver for some receive antennas, and performing channel estimation for other receive antennas while the receiver is not detecting unicast traffic.

In some embodiments, the method further comprises using results from the channel estimation in performing antenna selection.

In some embodiments, the method further comprises: performing antenna selection at the multiple antenna receiver to select a number of receive antennas equal to a number of antennas transmitting the signal.

According to another aspect of the invention, there is provided an access node configured to implement the methods described above.

According to yet a further aspect of the invention, there is provided an access node comprising: at least N transmit antennas, N=>2; a transmission resource partitioner configured to: for a transmission resource comprising a frequency component and/or a time component, define a first traffic portion and a second traffic portion, the first traffic portion being distinct from the second traffic portion; a spatial multiplexer configured to: transmit broadcast traffic on at least one first antenna of the at least N transmit antennas in the first traffic portion using a first sub-channelization based on either one of or a combination of FDM (frequency division multiplexing) sub-channelization and TDM (time division multiplexing) sub-channelization; transmit multicast traffic on at least one second antenna of the at least N transmit antennas, the at least one second antenna being distinct from the at least one first antenna, in the first traffic portion using a second sub-channelization based on either one of or a combination of FDM sub-channelization and TDM sub-channelization.

In some embodiments, the access node is further configured to: transmit unicast traffic on at least one antenna of the at least N antennas in the second traffic portion using a third sub-channelization based on either one of or a combination of FDM sub-channelization and TDM sub-channelization.

In some embodiments, the broadcast traffic and the multicast traffic are transmitted with different transmit powers.

According to still another aspect of the invention, there is provided an access node comprising: at least N transmit antennas, N=>2; a transmission resource partitioner configured to: for a transmission resource comprising a frequency component and/or a time component, define a first traffic portion and a second traffic portion, wherein for a portion of the transmission resource, a portion of the first traffic portion overlaps with a portion of the second traffic portion; a spatial multiplexer configured to: in the portion of the first traffic portion that overlaps with the portion of the second traffic portion, transmit broadcast/multicast traffic on at least one first antenna of the at least N transmit antennas in the first traffic portion using a first sub-channelization based on either one of or a combination of FDM (frequency division multiplexing) sub-channelization and TDM (time division multiplexing) sub-channelization; in the portion of the second traffic portion that overlaps with a portion of the first traffic portion, transmit unicast traffic on at least one second antenna of the at least N transmit antennas, the at least one second antenna being distinct from the at least one first antenna, in the second traffic portion using a second sub-channelization based on either one of or a combination of FDM sub-channelization and TDM sub-channelization.

In some embodiments, the access node is further configured to: transmit broadcast traffic on at least one of the at least N transmit antennas in the first traffic portion that does not overlap with the second traffic portion using a third sub-channelization based on either one of or a combination of FDM sub-channelization and TDM sub-channelization; transmit unicast traffic on at least one of the at least N transmit antennas in the second traffic portion that does not overlap with the first traffic portion using a fourth sub-channelization based on either one of or a combination of FDM sub-channelization and TDM sub-channelization.

In some embodiments, the access node further comprises: a receiver configured to receive antenna selection information that identifies a preferred one or more transmit antennas of the at least N transmit antennas to be used in a subsequent scheduling period.

In some embodiments, the broadcast/multicast traffic and the unicast traffic are transmitted with different transmit powers.

According to yet a further an aspect of the invention, there is provided an access terminal configured to implement the methods described above.

According to another aspect of the invention, there is provided an access terminal comprising: N receive antennas, N=>2; M receive radio chains, M=<N; an antenna switch matrix configured to receive a signal from each of the N receive antennas and route at least M signals of the N signals received by the N receive antennas to the M receive radio chains, at least one signal to each of the M receive radio chains; an antenna selector configured to: receive signals from the M receive radio chains; select at least M of the N receive antennas to each provide a signal to each of the M receive radio chains for a subsequent scheduling period; and notify the antenna switch matrix which at least M receive antennas are to be selected for the subsequent scheduling period.

In some embodiments, the antenna selector comprises: a channel estimator configured to perform channel estimation for each of the N receive antennas.

In some embodiments, N>M.

In some embodiments, the access terminal further comprises: a transmitter to transmit receive antenna selection information so as to identify which receive antenna is to be used in the subsequent scheduling period based on channel estimation performed by the channel estimator.

In some embodiments, the access terminal further comprises: a transmitter to transmit receive antenna selection information so as to identify a preferred set of transmit antennas to be used for transmitting to the access terminal in the subsequent scheduling period based on channel estimation performed by the channel estimator.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the attached drawings in which:

FIG. 6 is a schematic diagram of multiple AN each having two antennas transmitting broadcast layer and unicast layer information to an AT;

DETAILED DESCRIPTION OF THE PREFERRED EMBODIMENTS

Figure 1:
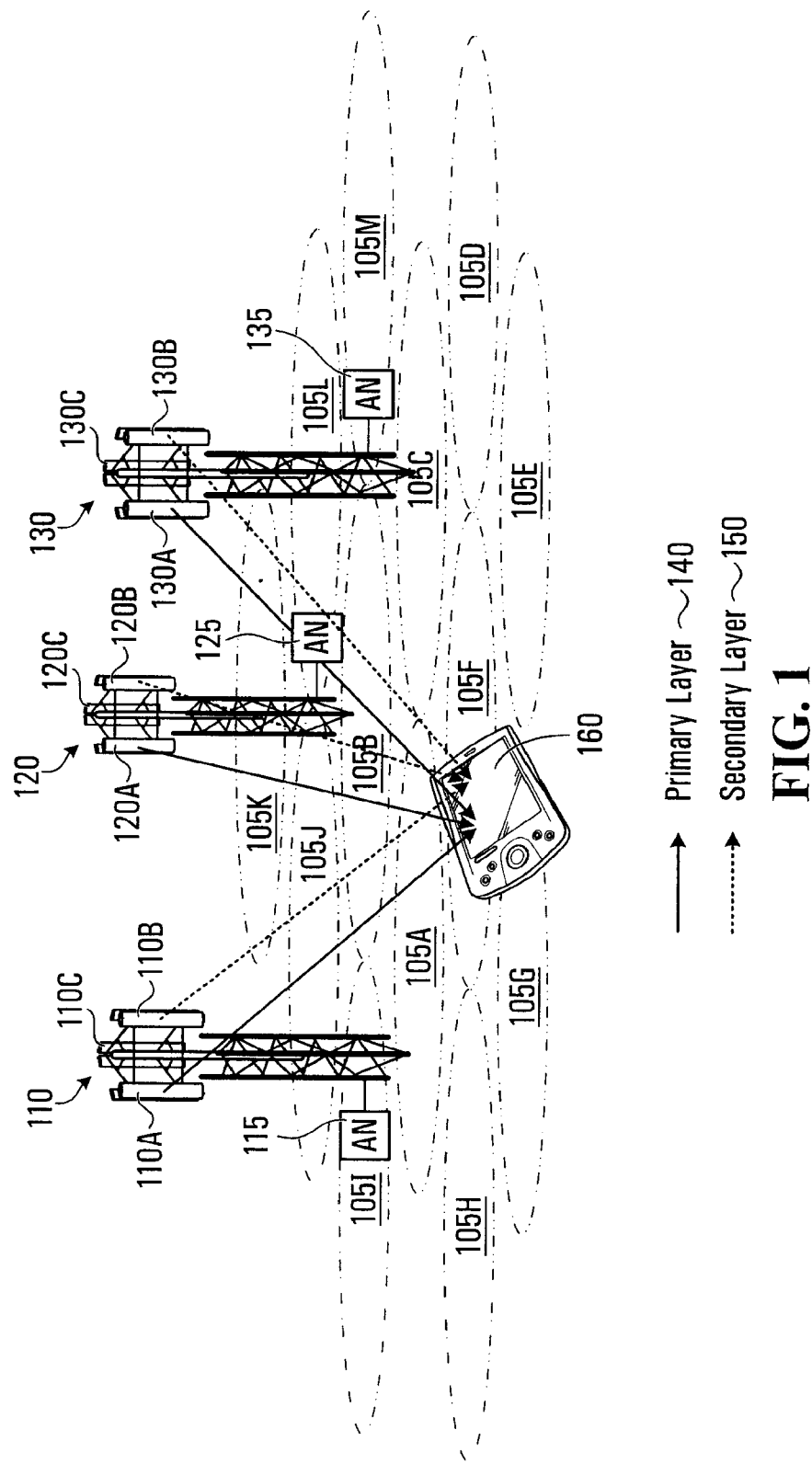
FIG. 1 is a schematic diagram of multiple access nodes (AN) having two antennas transmitting primary layer and secondary layer information to an access terminal (AT)

In a single frequency network (SFN) OFDM network, a common frequency resource in the form of a common set of OFDM subcarriers are in use by multiple transmitters throughout a network. It is noted that an SFN as described herein may be implemented in a context where other frequency resources are also used. For example, one OFDM band of sub-carriers could be used to implement an SFN, and another frequency band used to implement a frequency re-use scheme. However, that does not effect the allocation of resources within the common frequency resource that is being used to implement the SFN.

Spatial multiplexing can further improve coverage at an edge of a telecommunications cell in an SFN. Spatial multiplexing includes transmitting separately encoded signals on each of a number of different antennas, for example, one antenna for each separately encoded signal. However, in some embodiments, more than one antenna may be used for transmitting each separately encoded signal. A two-branch transmit cell-site can be used with a spatial multiplexing transmission format. A two branch transmit cell-site may generally be considered to include two transmit chains, in which each transmit chain includes one or more antennas. A specific case of a two branch transmit cell-site includes two transmit chains, in which each transmit chain includes only a single antenna. In the description that follows, two-branch transmission and reception is assumed, but more generally, N-branch transmission and reception is contemplated.

In some embodiments of the present invention, spatial multiplexing involves two-layer transmission at an AN (access node) and reception by at least two receive antennas at an AT (access terminal). A single "layer" is a separately encoded stream of a transmission signal that is transmitted from at least one antenna. Two layer transmission in some embodiments of the present invention involves spatially multiplexed transmission of two or more different encoded streams, each stream transmitted from at least one antenna. An AT may for example be a user terminal such as any one of a stationary terminal, nomadic terminal or mobile terminal. A non-exhaustive list of examples of an AT include a cellular telephone, a wirelessly enabled computer, and a personal data assistant (PDA). An AN is a network node that is used by an AT to access a network. In some embodiments, AT are provided that have multiple antennas that are greater in number than the number of transmit antennas in the AN. For some such AT, for example a receive-only AT (e.g. broadcast/multicast function only), further enhancement can be achieved by performing a MIMO antenna switching technique to select a subset of this greater number of antennas that gives the best reception, as will be described in greater detail below.

Use of the term "antenna" within this application is not intended to limit the scope of the invention to a single antenna element. The term "antenna" may include a set of multiple antennas elements forming the "antenna", for example an antenna array, in which the multiple antenna elements are used for transmission of the same information or in which the multiple antenna elements are used in combination to transmit information transmitted from the "antenna". As a further example, in a transmitter or receiver having a first antenna and a second antenna, the first antenna may include one or more antenna elements and the second antenna may include one or more antenna elements. In some embodiments, the antenna is part of a virtual antenna array, in which multiple devices each having one or more respective antennas may use their antennas in a cooperative manner.

FIG. 1 depicts a simplified system diagram showing multiple telecommunications cells 105A-105M, each covering a geographical area. Each of cells 105A, 105B and 105C are shown to include an AN and a set of three pairs of antennas on a broadcast tower. In cell 105A, AN 115 is connected to broadcast tower 110 which has pairs of antennas 110A,110B,110C. In cell 105B, AN 125 is connected to broadcast tower 120 which has pairs of antennas 120A, 120B,120C. In cell 105C, AN 135 is connected to broadcast tower 130 which has pairs of antennas 130A,130B,130C. In the illustrated example, one antenna from each adjacent pair of antennas are used for sector coverage. For example in cell 105A, a first antenna from pair 110A and a first antenna from pair 110B are used for transmissions in a first sector of cell 105A, a second antenna from pair 110B and a first antenna from pair 110C are used for transmissions in a second sector of cell 105A and a second antenna from pair 110C and a second antenna from pair 110A are used for transmissions in a third sector of the cell.

ATs travel within and amongst the cells 105A-105M. In the illustrated example, one AT 160 is illustrated at a physical location that is near the border of cells 105A,105B, 105C. AT 160 is shown receiving signals from broadcast towers 110,120,130.

The signals transmitted by the antennas are transmitted on a two dimensional transmission resource. A first dimension of the transmission resource is frequency that is represented by multiple sub-carriers. A second dimension of the transmission resource is time and is represented by durations of time.

For a given portion of a transmission resource for which two signals are multiplexed, a primary layer transmission 140 (indicted by a solid line) is transmitted on a first antenna of antenna pairs 110A,120A,130A from each of broadcast towers 110,120,130. A secondary layer transmission 150 (indicted by a dashed line) is transmitted on a first antenna of antenna pairs 110B,120B,130B from each of broadcast towers 110,120,130.

Only one AT and three AN are shown in FIG. 1, but it is to be understood that the numbers of cells, the number of ATs per cell and the number of ANs travelling within and amongst cells at any given time are implementation specific. Depending upon its position, a given AT may receive the transmissions of multiple AN.

In portions of the transmission resource that the two layers are not being spatially multiplexed, one or both antenna of the two antennas that are used for transmitting the primary and secondary layers in the portion where the primary and secondary layers are spatially multiplexed may be used for transmitting traffic allocated to the portions where there is no spatial multiplexing.

When implementing two-layer transmission from each cell (or each sector in a sectorized implementation), a pilot and data for each layer constitutes an SFN transmission. A level of diversity is already achieved by the SFN macro-diversity transmission, i.e. the use of separate transmitters transmitting the same information, for example, transmitters in multiple cells of a network. The use of additional spatial multiplexing i.e. a respective layer transmitted from each antenna within the same portion of a transmission resource, is provided so as to further improve throughput at the edge of a cell.

Some embodiments of the invention provide for the distinct separation of the transmission resource into a broadcast/multicast zone and a unicast zone. In a particular embodiment, a portion of the transmission resource is defined for broadcast/multicast traffic that use different sub-carriers and/or transmission intervals than a portion of the transmission resource that is used for unicast traffic.

In the broadcast/multicast zone, a first single layer transmission and a second single layer transmission are spatially multiplexed. The first single layer is used to transmit broadcast traffic and the second single layer is used to transmit multicast traffic. Each of the first and second single layers are transmitted using a respective sub-channelization based on at least one of FDM (frequency division multiplexing) and TDM (time division multiplexing) sub-channelization. Referring to FIG. 1, for this implementation, the primary layer is for broadcast traffic and the secondary layer is for multicast traffic, when broadcast and multicast traffic are spatially multiplexed in the broadcast/multicast zone of the transmission resource.

In the broadcast/multicast zone, a first antenna transmits the first single layer traffic and a second antenna transmits the second single layer traffic. The first single layer traffic and the second single layer traffic are spatially multiplexed in the same portion of the transmission resource. In the unicast zone, one or both of the antennas are used for transmission of unicast traffic on different sub-carriers and/or transmission intervals than are used for broadcast/multicast traffic.

During the broadcast/multicast portion of the transmission resource when the ANs are transmitting broadcast and/or multicast information, the ANs are transmitting the same information at the same time, hence any ATs in any of the cells are receiving the same signals from all ANs at the same time.

Another embodiment of the invention provides for superposition, also referred to herein as overlap, of broadcast traffic and unicast traffic in at least a same portion of a transmission resource. In this embodiment, the transmission resource is a two dimensional transmission resource in time and frequency as defined above. The broadcast traffic is a first single layer transmission and unicast traffic is a second single layer transmission. That is, the broadcast traffic and unicast traffic are spatially multiplexed using a first antenna to transmit the first single layer transmission on some of the same sub-carriers and/or transmission intervals as a second antenna transmits the second single layer transmission.

In some embodiments, portions of the transmission resource that are not used for overlapping broadcast traffic and unicast traffic are used distinctly for broadcast traffic and unicast traffic, respectively. That is, broadcast traffic is transmitted on different and distinct sub-carriers and/or transmission intervals than unicast and broadcast traffic in the overlapping portion of the transmission resource and unicast traffic in the non-overlapping portion of the transmission resource allocated to unicast traffic. Likewise, unicast traffic is transmitted on different and distinct sub-carriers and/or transmission intervals than unicast and broadcast traffic in the overlapping portion of the transmission resource and broadcast traffic in the non-overlapping portion of the transmission resource allocated to broadcast traffic.

In the first case of segregation of broadcast/multicast and unicast traffic in which spatial multiplexing is used for broadcast and multicast traffic transmitted on separate layers and in the second case of at least partially overlapping portions of a transmission resource by spatial multiplexing separate single layers for broadcast and unicast traffic, any type of sub-channelization approach can be employed to define sub-channels within a two dimensional OFDM transmission resource (sub-carriers in frequency×OFDM symbol durations in time). Two particular examples of conventional sub-channelization are localized sub-channelization and diversity sub-channelization.

In some embodiments, for the segregation arrangement, the sub-channels for broadcast/multicast zone can be defined using different parameters or the same parameters with different values than the sub-channels for the unicast zone. Parameters used to define a respective zone may include, but are not limited to, FFT size, sub-carrier separation and number and distribution of data tones in each subchannel.

In some embodiments, for the superposition arrangement, the sub-channels for portions of the first layer transmission that overlap with portions of the second layer transmission are implemented using the same parameters, and possibly the same values for those parameters, as for the sub-channels used for the portions of the second layer transmission. In some implementations, the sub-channels for the overlapping portions of the first layer transmission and the second layer transmission use an identical sub-channel structure.

Segregation of Broadcast/Multicast and Unicast

A more detailed discussion follows below of embodiments involving segregation of broadcast/multicast and unicast, in which spatial multiplexing is used for broadcast and multicast traffic.

In some embodiments, the broadcast/multicast zone is for broadcast and/or multicast traffic transmitted to all coverage areas while the unicast zone is unicast traffic transmitted to only the particular coverage area that needs to receive it, when it needs to receive it.

AN Transmission of Single-Layer Broadcast Traffic and Single Layer Multicast Traffic In some embodiments, the first layer is for broadcast traffic transmitted to all coverage areas while the second layer is multicast traffic that may be transmitted to the particular coverage area that needs to receive it, when it needs to receive it.

Figure 10A:
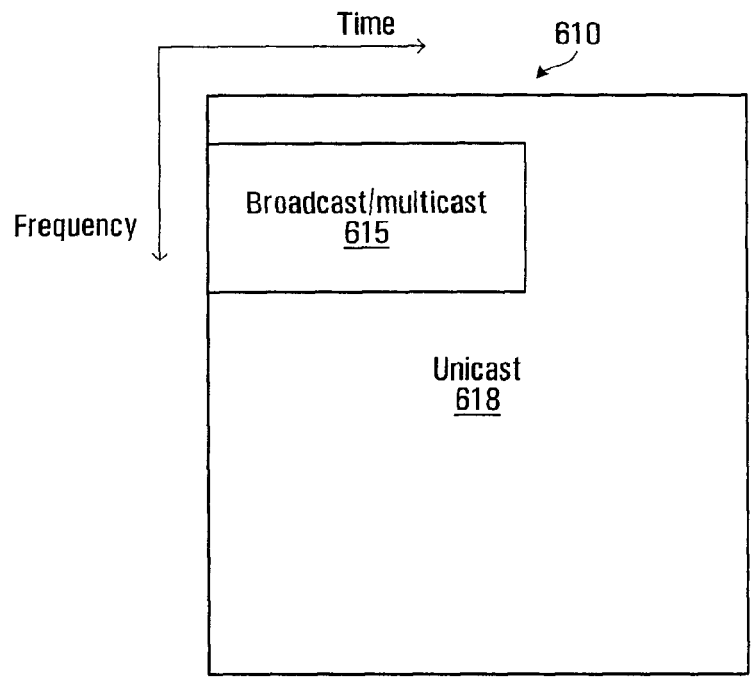
FIG. 10A is a block diagram of an example of segregation of broadcast/multicast and unicast transmission in a frequency-time resource according to an embodiment of the invention.

FIG. 10A shows a very simplified view of the segregation approach. FIG. 10A illustrates a combined frequency and time transmission resource 610. Frequency is represented by a plurality of sub-carriers (not shown) along the vertical axis and time by a plurality of OFDM symbol durations (not shown) along the horizontal axis. The transmission resource 610 illustrates zones that are each allocated a subset of the transmission resource 610. In FIG. 10A, a portion 615 of the transmission resource 610 is allocated for broadcast/multicast traffic and a remaining portion 618 of the transmission resource 610 is allocated for unicast traffic. Portion 615 is separate and distinct from remaining portion 618. In the broadcast/multicast portion, a first antenna is used to transmit the first layer traffic (broadcast) and a second antenna is used to transmit second layer traffic (multicast) for the same time/frequency as the first antenna. The unicast traffic can be transmitted in the unicast portion on one or both of the same antennas during the unicast portion 618 of the transmission resource 610.

In some embodiments, spatial multiplexing can be applied to the portion of the transmission resource used for unicast traffic. For example, transmission of unicast traffic in the unicast portion of the transmission resource may occur by spatially multiplexing unicast traffic on multiple antennas.

In some embodiments, broadcast and multicast traffic are identified by transmitting common multiple input multiple output (MIMO) pilots on the respective antennas from which the broadcast and multicast traffic are transmitted. A first antenna is enabled for transmitting the first layer traffic (broadcast) and the second antenna is enabled for transmitting the second layer traffic (multicast).

The unicast traffic is transmitted at times/frequencies that do not interfere with the broadcast/multicast traffic, hence the overall approach being referred to as a segregation approach. For example, in a two dimensional frequency-time resource, the resource may be sub-divided in a TDM manner such that for particular durations of time unicast traffic transmissions occur and for other distinct durations of time broadcast/multicast traffic transmissions occur as spatially multiplexed single layer broadcast and multicast traffic on first and second antennas, respectively. In another example, the resource may be sub-divided in an FDM manner such that for particular frequency sub-carrier bands unicast traffic transmissions occur and for other distinct frequency sub-carrier bands broadcast/multicast traffic transmissions occur as spatially multiplexed single layer broadcast and multicast traffic on first and second antennas, respectively. Sub-dividing the resource into irregularly shaped zones of time and frequency resources, as opposed to specifically TDM or FDM divisions, is another possible manner for allowing first and second layer transmissions to be transmitted.

In some implementations, during a portion of the transmission resource used for unicast traffic transmission, only one antenna is used for transmission of the unicast traffic. In some implementations, during a portion of the transmission resource used for unicast traffic transmission both antennas are used for transmission of unicast traffic.

In some embodiments, the second layer transmission (multicast) in the broadcast/multicast traffic portion may not be enabled for every sector.

In some embodiments the second layer transmission (multicast) in the broadcast/multicast traffic portion may be transmitted with different transmit power than the first layer transmission in the broadcast/multicast traffic portion.

Figure 2:
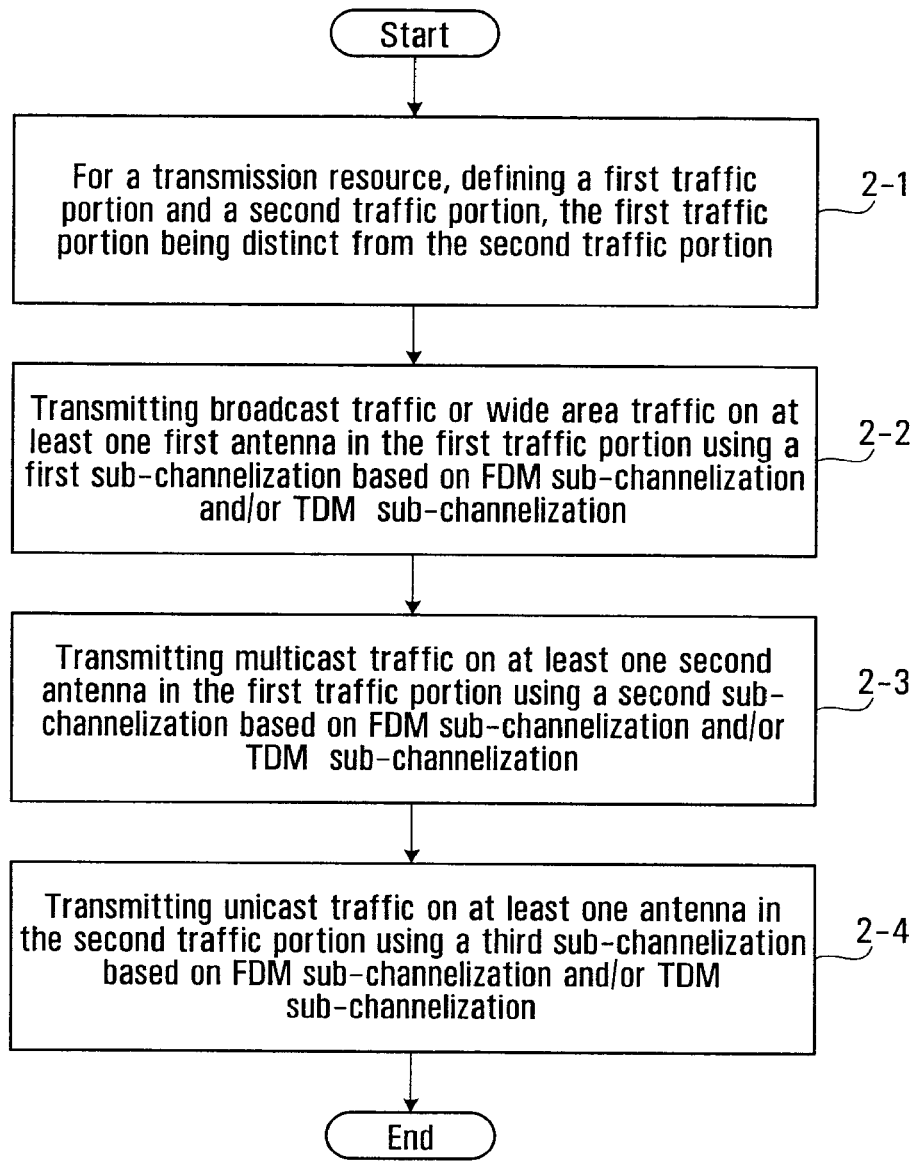
FIG. 2 is a flow chart showing a method for use in a transmitter according to an embodiment of the invention.

A method of transmission for use in a multiple antenna transmitter will now be described with reference to FIG. 2. A first step 2-1 of the method involves for a transmission resource used by the multiple antenna transmitter, defining a first traffic portion of the transmission resource and a second traffic portion of the transmission resource, the first traffic portion being distinct from the second traffic portion.

A second step 2-2 includes transmitting broadcast traffic on at least one first antenna of a plurality of antennas in the first traffic portion using a first sub-channelization based on either one of or a combination of FDM (frequency division multiplexing) sub-channelization and TDM (time division multiplexing) sub-channelization.

A third step 2-3 includes transmitting multicast traffic on at least one second antenna of the plurality of antennas in the first traffic portion using a second sub-channelization based on either one of or a combination of FDM sub-channelization and TDM sub-channelization. The at least one first antenna is distinct from the at least one second antenna.

A fourth step 2-4 includes transmitting unicast traffic on one or both of the first and second antennas in the second traffic portion using a third sub-channelization based on either one of or a combination of FDM sub-channelization and TDM sub-channelization.

In some embodiments the parameters used in the first and second sub-channelizations are the same, but these parameters are different from the parameters used in the third sub-channelization. In some embodiments the parameters used in the first, second, and third sub-channelizations are all different.

In another embodiment, when a transmission resource is partitioned into a first traffic portion and a second traffic portion, the first traffic portion is a wide area/local area traffic portion and the second traffic portion is a unicast traffic portion. In the wide area/local area traffic portion, a first single layer is used to transmit wide area traffic and a second single layer is used to transmit local area traffic. The wide area traffic may be traffic transmitted in multiple cells of a network and local area traffic may be traffic transmitted in one cell or a subset of cells smaller than the number of the multiple cells transmitting wide area traffic. For example, in the context of multimedia content, wide area traffic may represent a television signal for a national television network that is broadcast across an entire country by a carrier network. A local area traffic may be a television signal for a regional television network that is only broadcast in a city and surrounding area by a carrier network.

An access node according to some embodiments of the invention may be broadly described as having at least N transmit antennas, N=>2, a transmission resource partitioner and a spatial multiplexer.

In some embodiments, the transmission resource partitioner is configured to: for a transmission resource comprising a frequency component and/or a time component, define a first traffic portion and a second traffic portion, the first traffic portion being distinct from the second traffic portion.

In some embodiments, the spatial multiplexer is configured to: transmit broadcast traffic on at least one first antenna of the at least N transmit antennas in the first traffic portion using a first sub-channelization based on either one of or a combination of FDM (frequency division multiplexing) sub-channelization and TDM (time division multiplexing) sub-channelization; and transmit multicast traffic on at least one second antenna of the at least N transmit antennas, the at least one second antenna being distinct from the at least one first antenna, in the first traffic portion using a second sub-channelization based on either one of or a combination of FDM sub-channelization and TDM sub-channelization.

AT Reception of Single-Layer Broadcast/Multicast and Single-Layer Unicast

In some implementations, the AT has at least two receive antennas and performs spatial multiplexing decoding. In a broadcast/multicast traffic portion of the transmission resource the AT processes MIMO pilots to detect each layer of the spatially multiplexed two-layer transmission. As the portion of the transmission resource used for broadcast/multicast traffic is distinct from the portion of the transmission resource used for unicast traffic, basic reception of the two-layer transmission may be achieved by a two-branch receiver at the AT with spatial de-multiplexing capability. For implementations in which the secondary layer transmission is not enabled for all sectors, the AT processes the MIMO pilots to detect single layer traffic from the first layer only.

Some embodiments of the invention provide for enhanced reception by the receiver capable of receiving the two-layer transmissions. In some implementations, additional reception radio chains and/or additional antennas are provided beyond the minimum number of two reception radio chains and antennas for the two transmit antenna case. A radio reception chain includes a set of components for one or more of receiving, decoding, downconverting and performing other functionalities on a received signal. Additional reception radio chains might be used, for example for a receive-only AT with only broadcast/multicast receive functionality.

In other implementations, additional antennas in the AT are provided, but additional reception radio chains are not, and MIMO antenna selection is performed to select appropriate antennas for reception from the total number of the available antennas. Therefore, in such implementations there are more antennas available than there are reception radio chains. Increasing receive diversity in this manner may further improve the coverage. The antenna selection mechanism is implementation specific. A particular example of an antenna selection mechanism is one that is cyclic redundancy check (CRC) driven.

Figure 3:
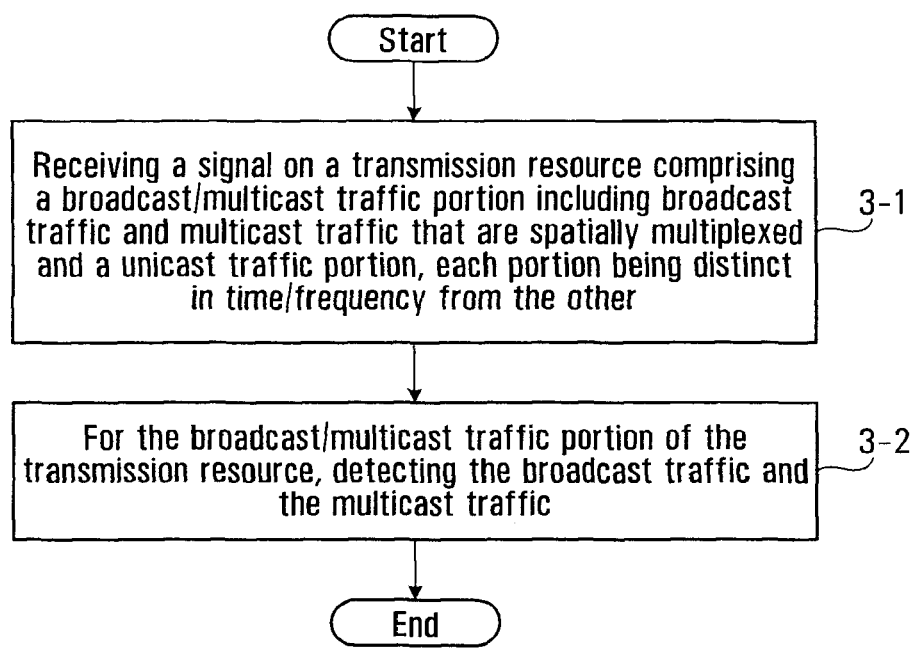
FIG. 3 is a flow chart showing a method for use in a receiver according to an embodiment of the invention.

A method of reception for use in a multiple antenna receiver will now be described with reference to FIG. 3. A first step 3-1 of the method involves receiving a signal on a transmission resource comprising a broadcast/multicast traffic portion of the transmission resource including broadcast traffic and multicast traffic that are spatially multiplexed and a unicast traffic portion of the transmission resource, each portion being distinct in time/frequency from the other.

A second step 3-2 includes, for the broadcast/multicast traffic portion of the transmission resource, detecting the broadcast traffic and the multicast traffic.

In some embodiments, if the multiple antenna receiver comprises N receive branches and greater than N receive antennas, N>=2, the method may involve determining whether to use only N or greater than N receive antennas for receiving the signal on the transmission resource.

In some embodiments, the method may further comprise: estimating channel characteristics for each of the available receive antennas; and selecting at least N available receive antennas for receiving the signal.

Example Access Terminal

Figure 4A:
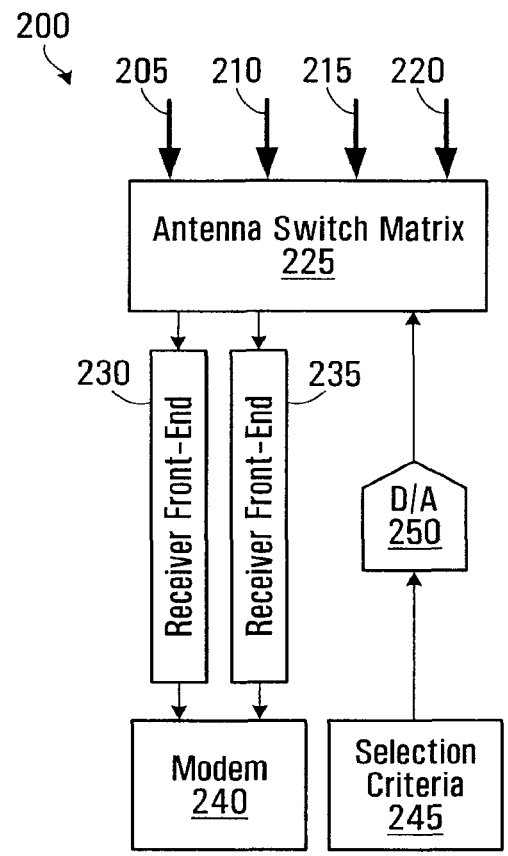
FIG. 4A is a block diagram of an exemplary AT having four antennas according to an embodiment of the invention.

FIG. 4A is a block diagram of an example AT 200. AT 200 has a set of four antennas 205,210,215,220 connected to a first input of an antenna switch matrix 225. A first outputs of the antenna switch matrix 225 is coupled to a first receiver front-end module 230 and a second output of the antenna switch matrix 225 is coupled to a second receiver front-end module 235. Outputs of the receiver front-end modules 230,235 are each coupled to a MODEM (modulator/demodulator) 240. An output from the MODEM 240 is coupled to an input of a selection criteria module 245. An output of the selection criteria module 245 is coupled to a second input of the antenna switch matrix 225. In the particular case of FIG. 4A, the selection criteria module 245 and the antenna switch matrix 225 are coupled together via a digital-to-analog (D/A) converter 250.

In the example depicted, there are four receive antennas 205,210,215,220, and the antenna switch matrix 225 is used to switch two of the antennas to respective receiver front-ends 230,235. More generally, the number of antennas and/or the number of receiver front-end modules are implementation specific and thus in some implementations the number of antennas and/or the number of receiver front-end modules will be different than that of the example of FIG. 4A.

The AT 200 may also have transmit circuitry (not shown) that would allow it to transmit to an AN. For example, in some embodiments, the access terminal may include a transmitter to transmit receive antenna selection information so as to identify which receive antenna is to be used in the subsequent scheduling period based on channel estimation performed by the channel estimator. In some embodiments, the access terminal may include a transmitter to transmit receive antenna selection information so as to identify a preferred set of transmit antennas to be used for transmitting to the access terminal in the subsequent scheduling period based on channel estimation performed by the channel estimator.

The AT 200 may also include additional receiver circuitry components (not shown) that would allow the AT 200 to operate in a manner consistent with that described herein, but has comparable or improve performance.

The MODEM 240, in combination with the selection criteria module 245 form a selection feedback mechanism that involves processing signals received from the receiver front-end modules 230,235 and adjusting the antenna switch matrix 225 accordingly to select the antennas with the best receive characteristics at a given time.

Figure 4B:
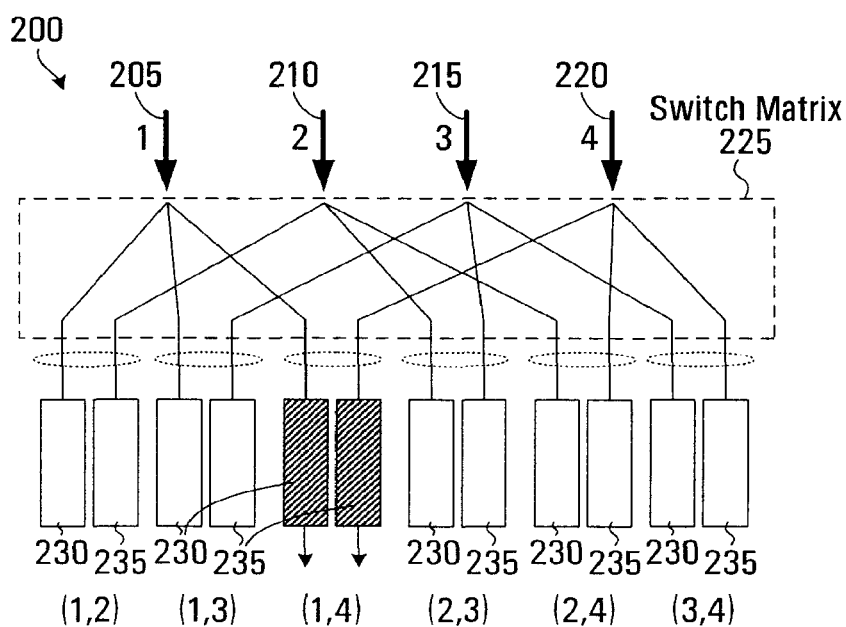
FIG. 4B is a schematic diagram of the AT of FIG. 4A illustrating various switching permutations capable of being performed by the AT for signals received by the four antennas.

FIG. 4B illustrates how the four antennas 205,210,21,220 may be connected to the two receiver front-end modules 230,235 via the antenna switch matrix 225. For the four antenna case, there are six different permutations of utilizing only two receive antennas. When the first and second antennas 205,210 are selected 260, outputs from these two antennas are provided to receiver front-end modules 230, 235, respectively. When the first and third antennas 205,215 are selected 261, outputs from these two antennas are provided to receiver front-end modules 230,235, respectively. When the first and fourth antennas 205,220 are selected 262, outputs from these two antennas are provided to receiver front-end modules 230,235, respectively. When the second and third antennas 210,215 are selected 263, outputs from these two antennas are provided to receiver front-end modules 230,235, respectively. When the second and fourth antennas 210,220 are selected 264, outputs from these two antennas are provided to receiver front-end modules 230,235, respectively. When the third and fourth antennas 215,220 are selected 265, outputs from these two antennas are provided to receiver front-end modules 230, 235, respectively. At the instant depicted, the first and fourth receive antennas 205,220 have been selected.

Transmission Signal Scheduling to Enable AT Antenna Switching

With reference again to FIG. 4B, it can be seen that when two of the four antennas are connected to the receiver front-end modules, channel conditions for those two antennas can be determined based on the received signals, but channel conditions for the other two antennas cannot be determined.

In some embodiments, the content transmitted to a given receiver in the broadcast/multicast traffic portion of the transmission resource is sub-divided in time into several time slots so as to allow a given AT time between portions of the respective time slot content to switch over to other antennas, determine channel quality, and make an antenna selection decision. This is depicted in FIG. 5.

Figure 5:
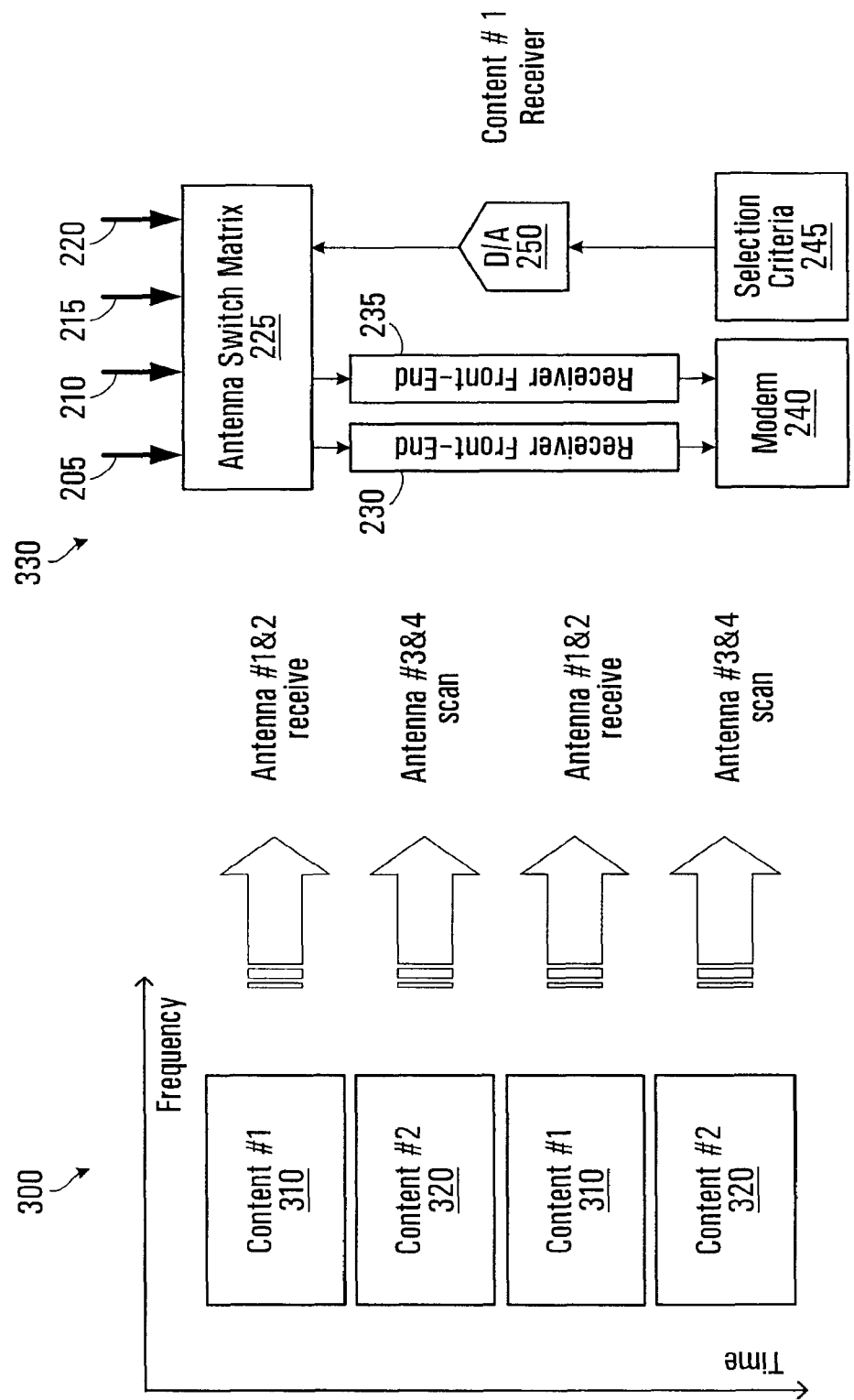
FIG. 5 is schematic diagram illustrating an example of how the AT of FIG. 4A can perform receipt of data on a particular antenna and scan channels of any other antenna to determine channel characteristics of unused channels.

FIG. 5 shows a two dimensional frequency-time resource 300, in which frequency is represented along the horizontal axis and time is represented along the vertical axis. The content for transmission on the transmission resource 300 is shown divided into zones that are identified as content #1 310 and content #2 320. Over time, the transmission alternates between content #1 310 and content #2 320. Also shown is a four antenna receiver of the type illustrated in FIG. 4A that is only interested in content #1 310, referred to as "Content#1 receiver" 330. When the receiver 330 is receiving content on two antennas (first and second antennas 205,210 in the illustrated example) it is measuring channel conditions for those antennas. When the receiver 330 is receiving content #2 320, which it is not interested in, it switches to the other two antennas (third and fourth antennas 215,220) and measures channel conditions. Before it is time to receive content #1 310 again, the receiver 330 makes a decision on which antennas to use for the next receive period based in part on channel condition information determined for all four receive antennas. In this example it is assumed that the majority of the same antennas that the AT 200 can view (i.e. the three to five antennas with sufficient signal strength to affect performance), are transmitting both Content #1 and Content #2.

An access terminal according to some embodiments of the invention may be broadly described as having N receive antennas, where N=>2; M receive radio chains, where M<=N; an antenna switch matrix and an antenna selector.

The antenna switch matrix is configured to receive a signal from each of the N receive antennas and route at least M signals of the N signals received by the N receive antennas to each of the M receive radio chains, at least one signal to each of the M receive radio chains.

The antenna selector is configured to: receive signals from the M receive radio chains; select at least M of the N receive antennas to each provide a signal to each of the M receive radio chains for a subsequent scheduling period; and notify the antenna switch matrix which at least M receive antennas are to be selected for the subsequent scheduling period.

In some embodiments, the antenna selector includes a channel estimator configured to perform channel estimation for each of the N receive antennas.

Superposition of Broadcast, Multicast and Unicast

A more detailed discussion follows below of embodiments involving superposition of broadcast and unicast in a common portion of a transmission resource, in which spatial multiplexing is used for broadcast and unicast traffic in the common portion of the transmission resource.

AN Transmission of Single-Layer Broadcast and Single-Layer Unicast

In another embodiment of the invention, spatial multiplexing two-layer transmissions is also employed. In such embodiments broadcast and unicast traffic are transmitted on first and second single layers in a portion of the transmission resource.

A first single layer is used for broadcast and/or multicast traffic and constitutes an SEN transmission and a second single layer is for unicast traffic. As discussed above, a level of diversity is already achieved by SFN macro-diversity transmission, but an increase in diversity may be obtained by spatial multiplexing the two single layer in an overlapping portion of the transmission resource, that is, in a portion of the transmission resource unicast and broadcast/multicast traffic share subcarriers and/or transmission durations.

Of a transmission resource used for two-layer transmission, at least a portion of the transmission resource that is used for the first single layer transmission may overlap with at least a portion of the transmission resource that is used for the second single layer transmission. In the area of overlap, a first antenna transmits the first single layer traffic (broadcast) on the same sub-carriers and/or the same time durations as a second antenna transmits the second single layer traffic (unicast). In some embodiments, in any non-overlapping portions of the transmission resource, only broadcast/multicast traffic is transmitted in portions assigned to broadcast/multicast traffic and only unicast traffic is transmitted in portions assigned to unicast traffic. In the non-overlapping portions, one or both antennas can be used for the broadcast/multicast traffic and the unicast traffic, respectively.

In embodiments in which first single layer traffic overlaps with resources used for second single layer traffic, interference caused by the overlap may result in using additional processing to recover the respective layers. In some embodiments, a SIC (successive interference cancellation) receiver is used to recover the first and second single layer traffic. In successive interference cancellation, when multiple single layer signals are received, i.e. signals from the first layer and second single layer traffic, respectively, detection of one or more of the single layer signals is detected and reconstructed by conventional single layer detection techniques. The one or more reconstructed single layer signals can then be cancelled from the overall received multiple single layer signals, leaving only a remaining single layer signal to be detected. In the illustrated example of using first and second single layer transmissions, the first single layer may be transmitted in a manner that allows robust and reliable reception. The first single layer signal can then be detected using conventional single layer detection techniques and cancelled from the received signal, leaving only the second single layer signal to be detected.

Figure 10B:
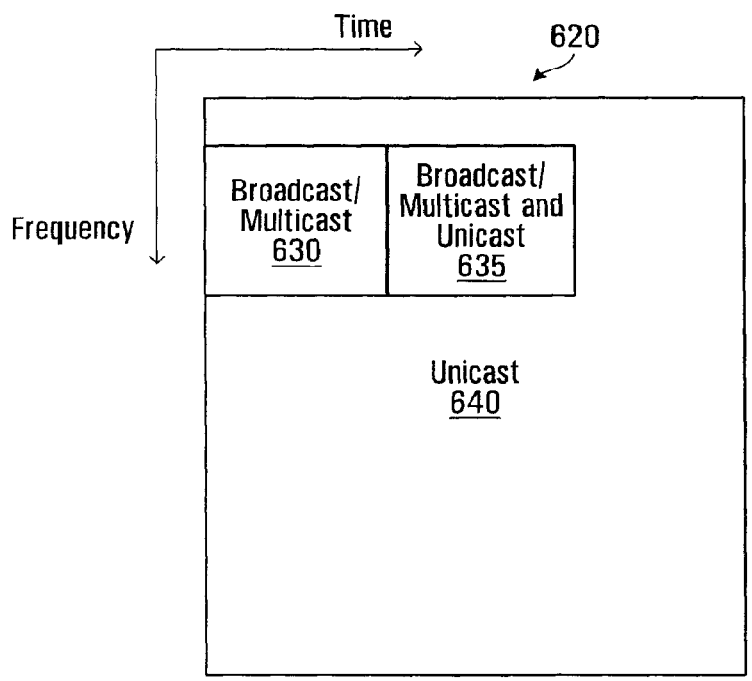
FIG. 10B is a block diagram of an example of superposition of broadcast and unicast transmission in a portion of frequency-time resource according to an embodiment of the invention.

FIG. 10B illustrates a combined frequency and time transmission resource 620 in which a portion of a broadcast/multicast traffic portion overlaps with a portion of a unicast traffic portion. In the example of FIG. 10B, broadcast and/or multicast traffic is first single layer traffic transmitted on a first antenna and unicast traffic is second single layer traffic transmitted on a second antenna. The broadcast traffic portion includes portions of the transmission resource 620 identified as 630 and 635. The unicast portion includes portions of the transmission resource 620 identified as 635 and 640. Within portion 630, only broadcast and/or multicast information is transmitted by one antenna, or both antennas of a two antenna transmitter. Within portion 640, only unicast information is transmitted by one antenna, or both antennas of the two antenna transmitter. Within portion 635, a first antenna of the two antenna transmitter is used for broadcast and/or multicast traffic and a second antenna of the two antenna transmitter is used for unicast traffic. In portion 635, the broadcast traffic and unicast traffic are spatially multiplexed.

The first single layer (broadcast and/or multicast) and second single layer (unicast) each transmit pilots to enable a receiver to perform layer separation. Similarly, if first and second antennas are both transmitting first single layer and second single layer traffic respectively, each antenna transmits pilots to enable the receiver to perform separation of the two single layer traffic signals. In some embodiments, the pilots transmitted by the first and second single layer are orthogonal with respect to one another.

In some embodiments, the first single layer has a frequency reuse=1 and the second single layer transmission has a frequency reuse=1. In other embodiments, the first single layer has a frequency reuse=1 and the second single layer transmission has a frequency reuse>1. For a single layer with frequency reuse=1, the entire network uses the same frequency bands for that layer. This is the case for a SFN, for example. For a single layer with frequency reuse>1, different frequency bands are assigned to different sectors of one or more cells in the network.

In some embodiments the first and second single layer transmissions may be transmitted with different transmit power. In some embodiments, the first and second layer transmissions in the shared portion of the transmission resource may be transmitted with different transmit power.

For example, the first single layer (broadcast/multicast) is transmitted with a different power than the second single layer (unicast). In some embodiments, the traffic in the distinct and non-overlapping portions of the transmission resource are transmitted at different powers.

Figure 6:
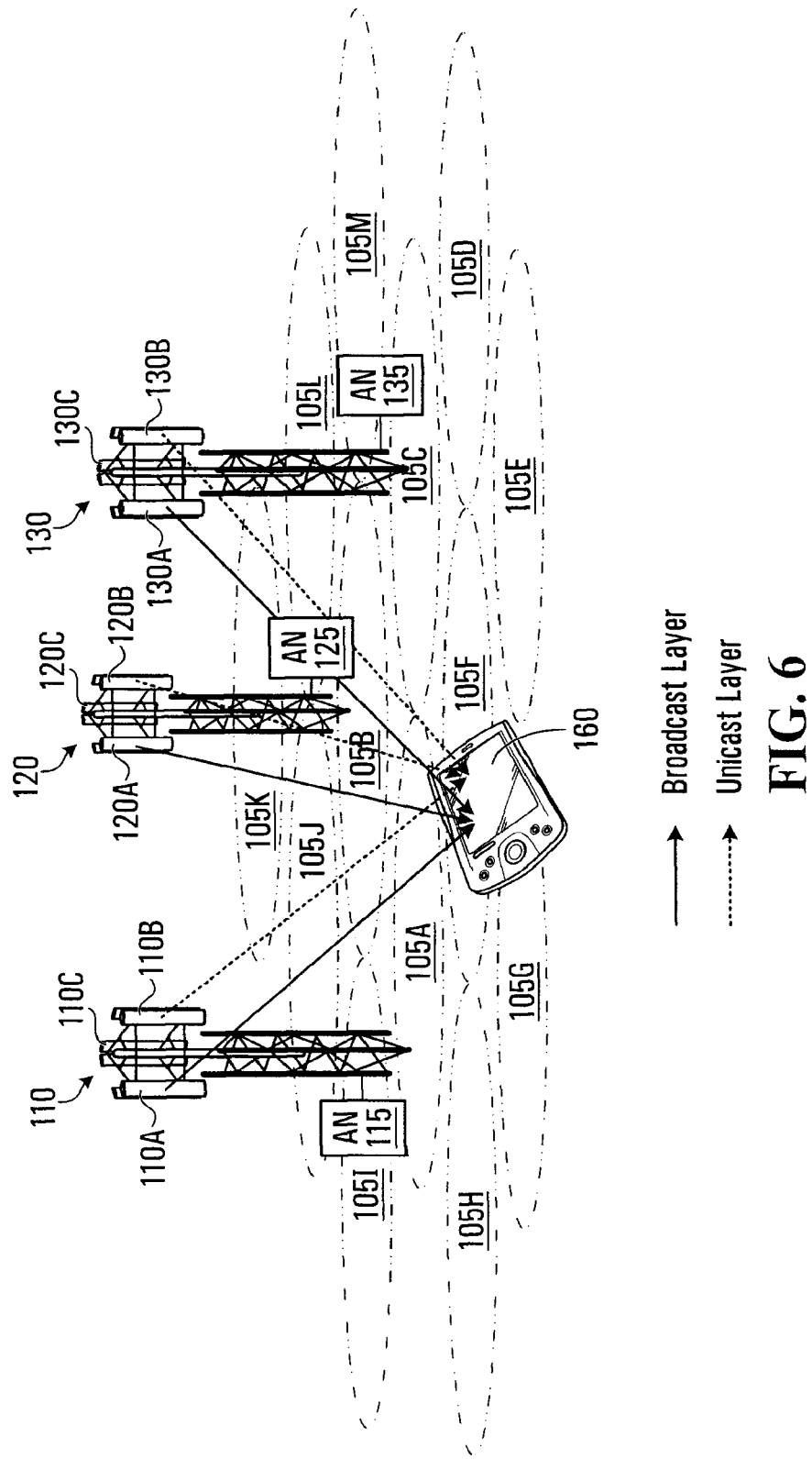

FIG. 6 depicts a simplified system diagram showing a set of AN each transmitting during the portion of the transmission resource that has overlapping broadcast/multicast traffic and unicast traffic. The broadcast/multicast traffic and unicast traffic are spatially multiplexed in this overlapping portion of the transmission resource by transmitting broadcast/multicast traffic as a first layer on a first antenna and unicast traffic as a second layer on a second antenna. FIG. 6 is similar to FIG. 1, except that in FIG. 1 the broadcast and multicast traffic were spatially multiplexed during the broadcast/multicast portion of the transmission resource. The AT 160 is illustrated receiving broadcast/multicast traffic from a first antenna of antenna pair 110A and unicast traffic from a first antenna of antenna pair 110B from broadcast tower 110, broadcast/multicast traffic from a first antenna of antenna pair 120A and unicast traffic from a first antenna of antenna pair 120B from broadcast tower 120, and broadcast traffic from a first antenna of antenna pair 130A and unicast traffic from a first antenna of antenna pair 130B from broadcast tower 130.

In the non-overlapping portions, that is the portions of the transmission resource that are separately and distinctly transmitting only broadcast traffic and only unicast traffic, respectively, one or both antennas can be used for the broadcast traffic and the unicast traffic.

An access node according to some embodiments of the invention may be broadly described as having at least N transmit antennas, N=>2; a transmission resource partitioner; and a spatial multiplexer.

In some embodiments, the transmission resource partitioner is configured to: for a transmission resource comprising a frequency component and/or a time component, define a first traffic portion and a second traffic portion, wherein for a portion of the transmission resource, a portion of the first traffic portion overlaps with a portion of the second traffic portion.

In some embodiments, the spatial multiplexer is configured to: in the portion of the first traffic portion that overlaps with the portion of the second traffic portion, transmit broadcast traffic on at least one first antenna of the at least N transmit antennas in the first traffic portion using a first sub-channelization based on either one of or a combination of FDM (frequency division multiplexing) sub-channelization and TDM (time division multiplexing) sub-channelization; and in the portion of the second traffic portion that overlaps with a portion of the first traffic portion, transmit unicast traffic on at least one second antenna of the at least N transmit antennas, the at least one second antenna being distinct from the at least one first antenna, in the second traffic portion using a second sub-channelization based on either one of or a combination of FDM sub-channelization and TDM sub-channelization.

Figure 7:
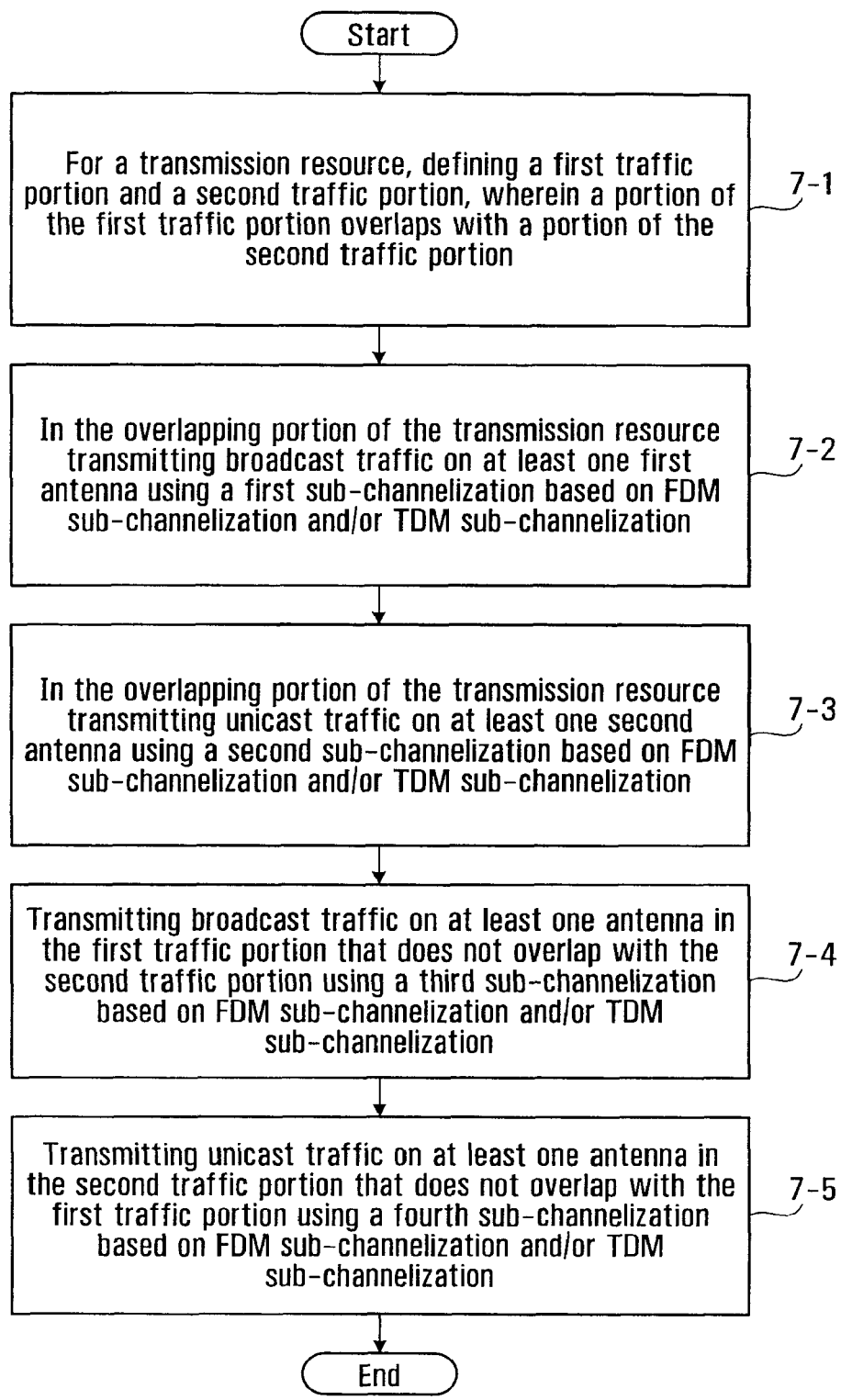
FIG. 7 is a flow chart showing a method for use in a transmitter according to an embodiment of the invention.

A method of transmission for use in a multiple antenna transmitter will now be described with reference to FIG. 7. A first step 7-1 of the method involves for a transmission resource used by the multiple antenna transmitter, defining a first traffic portion of the transmission resource and a second traffic portion of the transmission resource, wherein for a portion of the transmission resource, a portion of the first traffic portion overlaps with a portion of the second traffic portion.

A second step 7-2 includes in the portion of the transmission resource in which a portion of the first traffic portion overlaps with a portion of the second traffic portion; transmitting broadcast traffic on at least one first antenna of a plurality of antennas using a first sub-channelization based on either one of or a combination of FDM (frequency division multiplexing) sub-channelization and TDM (time division multiplexing) sub-channelization.

A third step 7-3 includes in the portion of the transmission resource in which a portion of the first traffic portion overlaps with a portion of the second traffic portion; transmitting unicast traffic on at least one second antenna of the plurality of antennas, the at least one second antenna being distinct from the at least one first antenna using a second sub-channelization based on either one of or a combination of FDM (frequency division multiplexing) sub-channelization and TDM (time division multiplexing) sub-channelization.

A fourth step 7-4 transmitting broadcast traffic on at least one antenna in the first traffic portion that does not overlap with the second traffic portion using a third sub-channelization based on either one of or a combination of FDM (frequency division multiplexing) sub-channelization and TDM (time division multiplexing) sub-channelization.

A fifth step 7-5 transmitting unicast traffic on at least one antenna in the second traffic portion that does not overlap with the first traffic portion using a fourth sub-channelization based on either one of or a combination of FDM (frequency division multiplexing) sub-channelization and TDM (time division multiplexing) sub-channelization.

In some embodiments the parameters used in the first and second sub-channelizations are the same, but these parameters are different from the parameters used in the third and fourth sub-channelization. In some embodiments the parameters used in the first and second sub-channelizations, are the same as one or both of the third and fourth sub-channelizations.

AT Reception of Single-Layer Broadcast and Single-layer Unicast

In some implementations, basic reception of the two-layer transmission can be achieved by a two-branch receiver at the AT with spatial demultiplexing capability and a capability to separate the overlapping layer signals. In some embodiments, the capability to separate the overlapping layer signals includes SIC capability. In the description that follows, two-branch transmission and reception is assumed, but more generally, N-branch transmission and reception is contemplated.

The AT processes pilots to detect the two-layer transmission. In some embodiments the pilots are orthogonal and the AT processes the orthogonal pilots to detect the first and second layer signals. For implementations in which the secondary layer transmission are not enabled for every sector, the AT processes the pilots from the first layer to detect single layer transmissions from the first layer only.

In some embodiments, additional antennas are provided to allow antenna selection diversity at the receiver. There may be additional receive chains, or there may be more antennas available than there are receive radio chains. Increasing the receive diversity order in this manner may be used to further improve the coverage.

Figure 8:
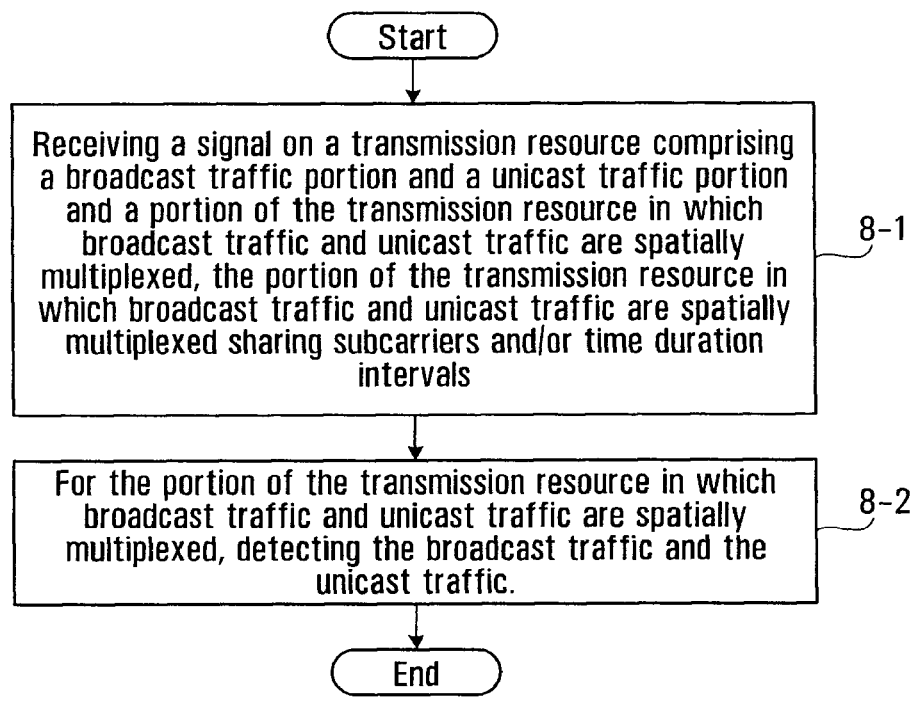
FIG. 8 is a flow chart showing a method for use in a receiver according to an embodiment of the invention.

A method of reception for use in a multiple antenna receiver will now be described with reference to FIG. 8. A first step 8-1 of the method involves receiving a signal on a transmission resource comprising a broadcast traffic portion of the transmission resource and a unicast traffic portion of the transmission resource and a portion of the transmission resource in which broadcast traffic and unicast traffic are spatially multiplexed, the portion of the transmission resource in which broadcast traffic and unicast traffic are spatially multiplexed sharing subcarriers and/or time duration intervals. The broadcast traffic portion may also include multicast traffic.

A second step 8-2 involves, for the portion of the transmission resource in which broadcast traffic and unicast traffic are spatially multiplexed, detecting the broadcast traffic and the unicast traffic.

In some embodiments, detecting the broadcast traffic and the unicast traffic involves using signal interference cancellation (SIC).

Design to Enable Unicast AT Antenna Switching

In some embodiments, in addition to or as an alternative to AT antenna switching described above, unicast AT antenna switching may be performed.

Figure 9:
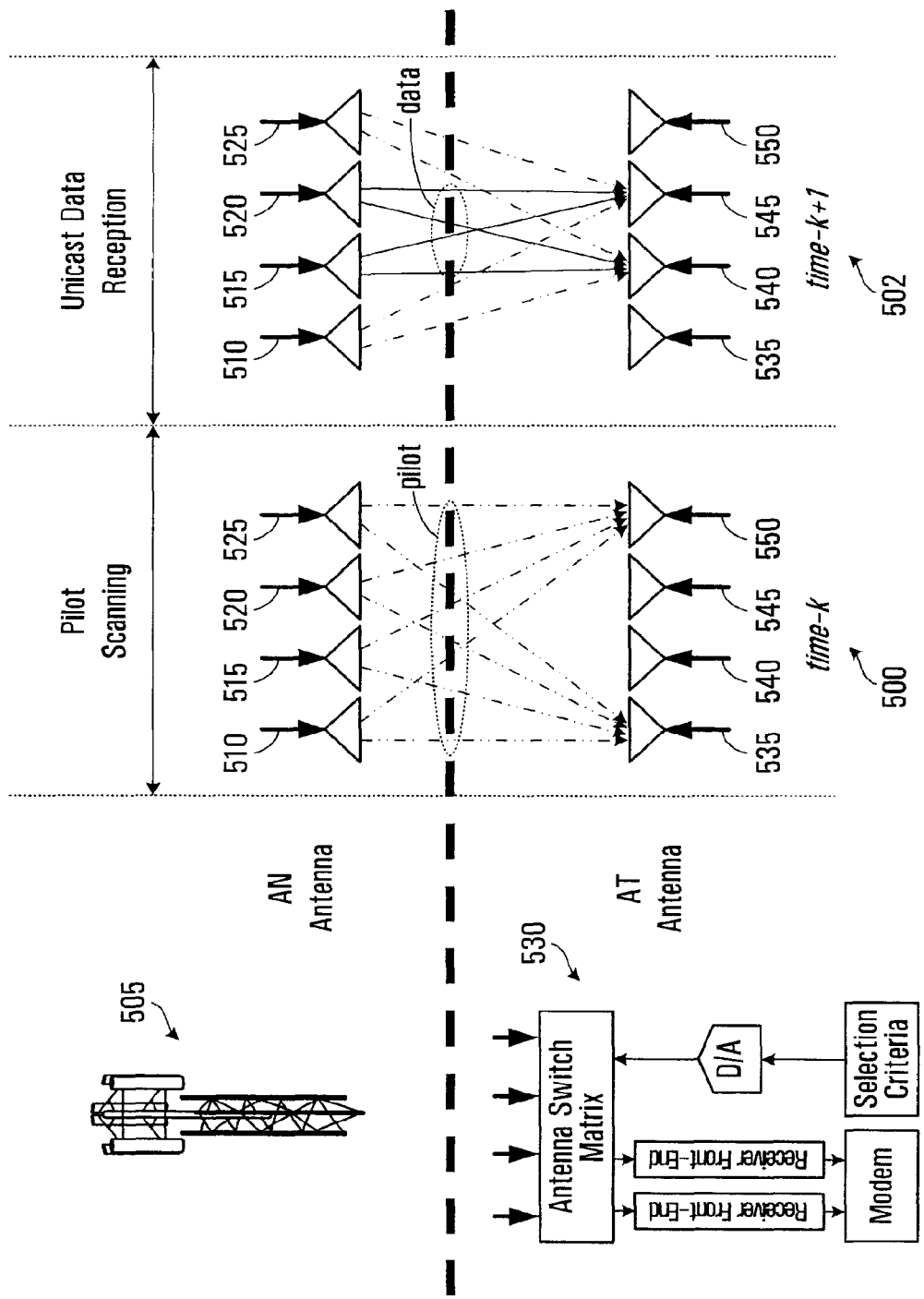
FIG. 9 is a schematic diagram of an example of unicast data reception allowing channel characterization of all channels to aid in antenna/channel selection according to an embodiment of the invention.

In some embodiments of the invention, unicast traffic is sent using a subset of an available set of antennas at the AN. An example is depicted in FIG. 9. Here, an AN 505 has four antennas 510,515,520,525, and the AT 530, which in the example of FIG. 9 is the same as that of FIG. 4A, has four antennas 535,540,545,550. However, only two antennas of each of the AN 505 and the AT 530, respectively, are used for a given unicast traffic transmission. As such, in FIG. 9, antenna selection takes place at both the AN 505 and the AT 530. In FIG. 9, two different time durations are represented, time-k 500 and time-k+1 502. In the illustrated example, at time-k 500, the AN 505 transmits pilots on all four antennas 510,515,520,525, and the AT 530 receives the pilots on two currently selected receive antennas 535,550. The AT 530 performs pilot measurement and channel estimation based on all of the transmit antennas 510,515,520,525, but only for the two currently selected receive antennas 535,550. At time k+1 502, the unicast transmission, including data and pilots, takes place only on two transmit antennas 515,520, and reception takes place only on two currently selected receive antennas 540,545. However, the other transmit antennas 510,525 are still transmitting pilots. With the combined transmit structure at time-k 500 and time-k+1 502, pilots are transmitted and received by every permutation of transmit antennas and receive antennas, and an appropriate selection of the antennas to use for the next unicast transmission and reception can be made. An appropriate selection of transmit and receive antennas to be used for the next unicast traffic transmission and reception is made based at least in part on the channel estimation of the various antennas. This requires feedback signalling to the AN 505 by the AT 530 in order to signal the use of the proper antennas for the unicast data transmission.

While the above example pertains to the use of two transmit antennas, four receive antennas and two front-end receiver modules, the number of transmit antennas, receive antennas and receive radio chains is implementation specific.

The methods and devices described herein may be used in relation to WiMAX (Worldwide Interoperability for Microwave Access), 4G MBS (Fourth Generation Mobile Broadband System), LTE (Long Term Evolution), LTE advanced, IEEE 802.16m, and MediaFLO applications. In some embodiments, broadcast, multicast, unicast, wide area and local area traffic as described herein are types of traffic that correspond to traffic consistent with these communication standards.

Numerous modifications and variations of the present invention are possible in light of the above teachings. It is therefore to be understood that within the scope of the appended claims, the invention may be practiced otherwise than as specifically described herein.

We claim:

1. A method in a multiple antenna transmitter comprising:
  for a transmission resource comprising a frequency component or a time component used by the multiple antenna transmitter:
    defining a first traffic portion and a second traffic portion of the transmission resource;
    identifying a portion of the transmission resource where the first traffic portion overlaps with the second traffic portion;
    in the portion of the transmission resource in which the first traffic portion overlaps with the second traffic portion;
      a) transmitting broadcast/multicast traffic on at least one first antenna of a plurality of antennas using a first sub-channelization based on either one of or a combination of FDM (frequency division multiplexing) sub-channelization and TDM (time division multiplexing) sub-channelization; and
      b) transmitting unicast traffic on at least one second antenna of the plurality of antennas, the at least one second antenna being distinct from the at least one first antenna, using a second sub-channelization based on either one of or a combination of FDM sub-channelization and TDM sub-channelization.

2. The method of claim 1, wherein transmitting broadcast/multicast and unicast traffic comprises:
  including gaps between sub-carrier frequency bands or transmission time durations of the unicast traffic.

3. The method of claim 1 further comprising:
  in the portion of the transmission resource in which the first traffic portion overlaps with the second traffic portion;
  selecting a value for sub-channelization parameters, wherein the value is the same for both the broadcast/multicast traffic and the unicast traffic.

4. The method of claim 3, wherein the sub-channelization parameters are one of: using the same value for sub-channelization parameters comprises using the same value for at least one of: FFT size; sub-carrier separation; or number and distribution of data tones in each subchannel.

5. The method of claim 3 further comprising:
  performing antenna selection at the multiple antenna transmitter to select a subset of a set of available antennas for transmission.

6. The method of claim 5 further comprising:
  performing antenna selection for a future transmission resource for transmission to a multiple antenna receiver to which the multiple carrier transmitter will be transmitting, based on feedback from the receiver for a transmission resource that was previously received by the receiver.

7. The method of claim 1, wherein transmitting broadcast/multicast traffic and transmitting unicast traffic comprises transmitting broadcast/multicast traffic and unicast traffic with different transmit powers.

8. The method of claim 1, wherein: spatially multiplexing at least one of the broadcast/multicast traffic and the unicast traffic, which are in a portion of the transmission resource that does not overlap with another traffic portion, on at least two antennas of the plurality of antennas.

9. The method of claim 1, wherein transmitting broadcast/multicast traffic and unicast traffic further comprises:

including pilots in the broadcast/multicast traffic and unicast traffic to enable identification of each type of traffic.

10. The method of claim 9, wherein including pilots in the broadcast/multicast traffic and unicast traffic comprises including orthogonal pilots in at least one of the broadcast/multicast traffic and unicast traffic.

11. The method of claim 1, wherein transmitting the first traffic portion and transmitting the second traffic portion comprises transmitting the first traffic portion and the second traffic portion with different frequency re-use factors.

12. The method of claim 11, wherein frequency reuse factors comprise frequency reuse=1 and frequency reuse>1.

13. An access node comprising:
   at least N transmit antennas, where N=>2;
   a transmission resource partitioner configured to:
   for a transmission resource comprising a frequency component or a time component,
   define a first traffic portion and a second traffic portion of the transmission resource;
   identifying a portion of the transmission resource where the first traffic portion overlaps with the second traffic portion;
   a spatial multiplexer configured to:
      in the portion of the transmission resource in which the first traffic portion overlaps with the second traffic portion, transmit broadcast/multicast traffic on at least one first antenna of a plurality of antennas using a first sub-channelization based on either one of or a combination of FDM (frequency division multiplexing) sub-channelization and TDM (time division multiplexing) sub-channelization; and
      transmit unicast traffic on at least one second antenna of the plurality of antennas, the at least one second antenna being distinct from the at least one first antenna, using a second sub-channelization based on either one of or a combination of FDM sub-channelization and TDM sub-channelization
   wherein the transmission resource partitioner includes gaps between sub-carrier frequency bands or transmission time durations of the unicast traffic when transmitting broadcast/multicast and unicast traffic.

14. The method of claim 1, wherein the portion of the transmission resource in which the first traffic portion overlaps with the second traffic portion comprises a portion of the first traffic resource and a portion of the second traffic resource.

* * * * *

UNITED STATES PATENT AND TRADEMARK OFFICE
CERTIFICATE OF CORRECTION

PATENT NO. : 9,462,425 B2  
APPLICATION NO. : 14/589994  
DATED : October 4, 2016  
INVENTOR(S) : Tong et al.

Page 1 of 1

It is certified that error appears in the above-identified patent and that said Letters Patent is hereby corrected as shown below:

On the Title Page

Item (63) should be replaced with the following:
"Continuation of application No. 12/865,627, filed on May 24, 2011, now Pat. No. 8,929,325, which is a national stage entry of application No. PCT/CA2008/000203, filed on Feb. 1, 2008."

Signed and Sealed this
Twentieth Day of February, 2018

Andrei Iancu
*Director of the United States Patent and Trademark Office*